United States Patent
Hagiwara et al.

(10) Patent No.: US 7,598,988 B2
(45) Date of Patent: Oct. 6, 2009

(54) SYSTEMS AND METHODS FOR DATA RECORDING

(75) Inventors: Tsuyoshi Hagiwara, Tokyo (JP); Kenichi Shinotsuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 613 days.

(21) Appl. No.: 11/114,101

(22) Filed: Apr. 26, 2005

(65) Prior Publication Data

US 2005/0237396 A1 Oct. 27, 2005

(30) Foreign Application Priority Data

Apr. 27, 2004 (JP) ............... 2004-132048

(51) Int. Cl.
*H04N 5/76* (2006.01)
(52) U.S. Cl. ................. 348/231.3; 348/231.8
(58) Field of Classification Search ............. 348/207.1, 348/220.1, 231.99, 231.2, 231.3, 231.7, 231.8
See application file for complete search history.

(56) References Cited

U.S. PATENT DOCUMENTS 6,816,190 B1 * 11/2004 Miyazawa ............... 348/231.6
2002/0046404 A1 * 4/2002 Mizutani ................. 725/58
2005/0226605 A1 * 10/2005 Wang et al. .............. 386/125

FOREIGN PATENT DOCUMENTS

| JP | 2001-275081 | 10/2001 |
| JP | 2002-245717 | 8/2002 |
| JP | 2002330383 A * | 11/2002 |

\* cited by examiner

*Primary Examiner*—Timothy J Henn
(74) *Attorney, Agent, or Firm*—Finnegan, Henderson, Farabow, Garrett & Dunner, L.L.P.

(57) ABSTRACT

An electronic camera creates image data by performing predetermined signal compression on a still image signal or a moving image signal picked-up and created by an image pickup unit, and records the created image data to a hard disk serving as a main storage medium. The image data is divided into a recording folder or recording file based on the unit of preset recording data capacity and records the divided recording folders or recording files to the hard disk. Each recording folders or recording files are transferred and are recorded to an SD-card serving as a storage medium for transfer, and are copied and recorded to another storage medium by using the SD-card.

4 Claims, 6 Drawing Sheets

LIST OF DIVIDED FILES

| FILE NAME | START TIME | END TIME | LINK AT END |
|---|---|---|---|
| PDR_0001. avi | 0:00:00 | 1:05:15 | PDR_0002. avi::0:0:30 |
| PDR_0001. avi | 1:04:45 | 2:10:00 | PDR_0002. avi::0:0:30 |
| PDR_0001. avi | 2:09:30 | 4:19:30 | PDR_0002. avi::0:0:30 |
| PDR_0001. avi | 4:19:00 | 8:38:30 | PDR_0005. avi:: ····· |
| ····· | | | |

SYSTEMS AND METHODS FOR DATA RECORDING

CROSS-REFERENCE TO RELATED APPLICATION

This application is based upon and claims the benefit of priority from the prior Japanese Patent Application No. 2004-132048 filed on Apr. 27, 2004; the entire contents of which are incorporated herein by reference.

BACKGROUND OF THE INVENTION

1. Field of the Invention

The present invention relates to a data recording apparatus which records continuous information data on time series and an electronic camera which records image data of a picked-up moving image or still image.

2. Description of the Related Art

Conventionally, a hard disk (hereinafter, simply referred to as an HDD) as a storage medium of various information data reduces the size thereof and increases the capacity of the amount of recorded information data. The compact HDD with the large recording capacity writes/reads data at random and therefore is much used as a storage device of various information data.

In particular, the recent HDD is used for a digital video camera, a digital still camera, or mobile data recording apparatus. A moving image recording apparatus serving as a video camera has such a problem that it takes a long time for searching for and reading a user's desiring scene from a long recorded moving image of which data is recorded from the start to the end of image pickup operation into one file.

In order to solve the problem, Japanese Unexamined Patent Application Publication No. 2001-275081 (hereinafter, referred to as Document 1) discloses a moving image recording apparatus having a random-access HDD serving as the storage medium wherein, when recording the picked-up moving image data to the HDD, a recording file is divided for every scene in which the motion of a picked-up moving image is detected to be recorded thereto.

That is, in the moving image recording apparatus proposed in document 1, the recording file is divided every scene in which a motion is detected and the divided recording files are recorded to the HDD and thus the fast play operation of the desired scene is enabled with the designation of the recording file in the play operation. However, the moving image recording apparatus disclosed in document 1 needs the storage medium having the recording capacity corresponding to the amount of data of image signals as a copy target to copy a moving image signal recorded to the HDD to another storage medium.

Further, a semiconductor memory card including a semiconductor memory, e.g., secure digital memory card (hereinafter, referred to as an SD-card) is put into practical use, as the storage medium. The SD-card is particularly used as the storage medium of a digital still camera. The SD-card is good in portability and easy for handling and management.

Further, a recent digital video camera and a digital still camera pick up and record the moving image and the still image. However, in the digital video camera and the digital still camera having the SD-card serving as the storage medium, the recording time of the moving image, namely, the recording capacity of the moving image data is limited depending on the allowable recording capacity of the SD-card. Therefore, the digital video camera and the digital still camera, in place of the SD-card serving as the storage medium, can pick up and record the moving image for longer time using the HDD.

In the moving image recording apparatus disclosed in document 1 or the digital video camera or digital still camera (hereinafter, referred to as an electronic camera) having the HDD serving as the storage medium, the picked-up image data recorded to the HDD is transferred via a personal computer to record to another storage medium having the recording capacity or more of the picked-up image data recorded to the HDD, e.g., a DVD-RAM.

When the picked-up image data has already been recorded up to the full recording capacity of HDD, the electronic camera can record the subsequent picked-up image data only by transferring and recording the data to another storage medium via the personal computer and by then creating a non-recording area.

Then, the electronic camera requires the easy transfer and recording of the picked-up image data recorded to the HDD to another storage medium, not via the personal computer.

BRIEF SUMMARY OF THE INVENTION

It is an object of the present invention to provide a data recording apparatus and an electronic camera which transfer and record data recorded to an HDD serving as a main storage medium with a large recording capacity to another storage medium by using the HDD and a mobile SD-card serving as a sub storage medium, namely, a transfer medium.

A data recording apparatus according to an aspect of the present invention comprises: a digital information data creating unit which creates digital information data by performing predetermined encoding and compression of continuous input information signals on time series; a storage medium which records the digital information data created by the digital information data creating unit; and a data recording control unit which divides the digital information data created by the digital information data creating unit into a plurality of data based on the unit of preset data capacity and records the data to the storage medium.

An electronic camera according to the aspect of the present invention comprises: an image pickup unit which converts an optical image of a subject into an electronic signal, performs predetermined signal processing of the electronic signal, and creates an image pickup signal; a digital image data creating unit which performs predetermined encoding and compression of the image pickup signal created by the image pickup unit and creates digital image data; a storage medium which records the digital image data created by the digital image data creating unit; and a data recording control unit which divides the digital image data based on the unit of preset data capacity and records the divided data to the storage medium.

The above and other objects, features and advantage of the invention will become more clearly from the following referring to the accompanying drawing.

DETAILED DESCRIPTION OF THE INVENTION

Hereinbelow, a detailed description is given of an embodiment of the present invention with reference to the drawings.

The inventor of the present invention focuses the long recording of a large amount of image data in the compact HDD with the large recording capacity and the simple handling and management of the mobile SD-card. An electronic camera according to one embodiment of the present invention uses the HDD for long recording serving as a main storage medium, the mobile SD-card with the simple handling and management serving as a sub storage medium, and further uses the SD-card serving as a transfer medium for transferring, to another storage medium, the picked-up image data recorded to the HDD.

Figure 10:
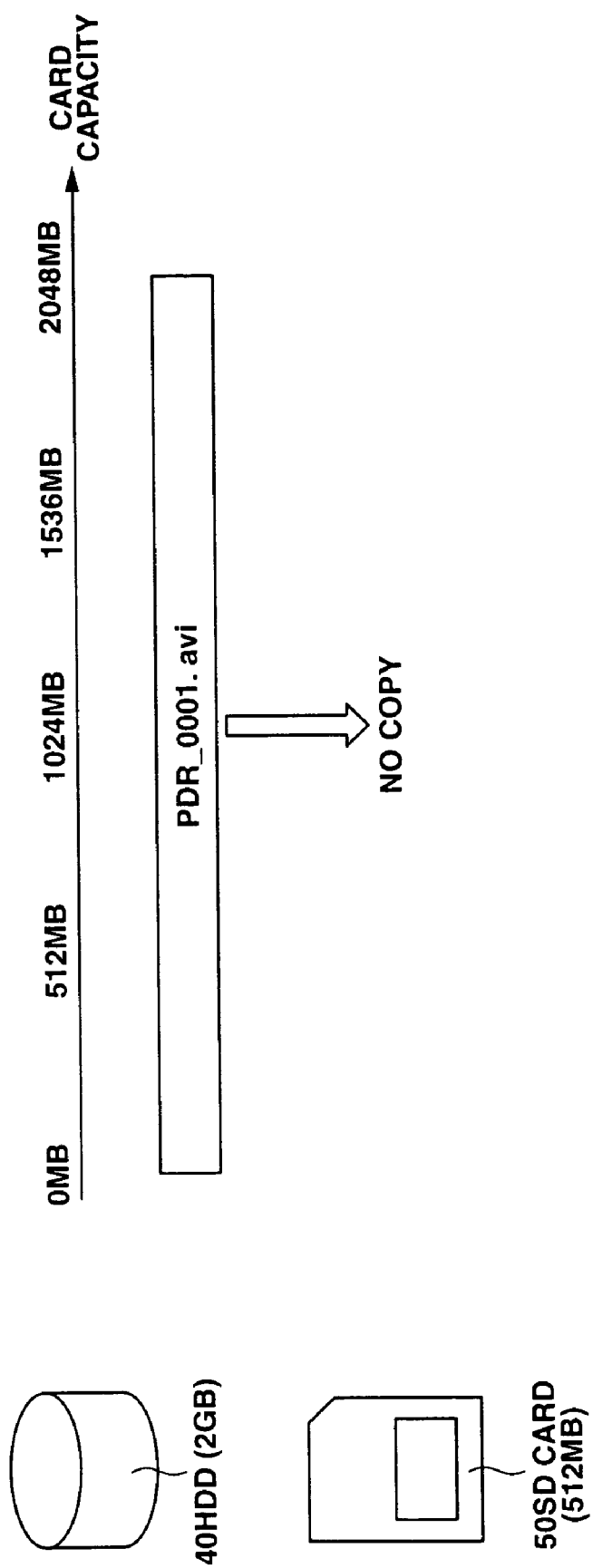
FIG. 10 is an explanatory diagram showing the structure of recording moving image data to a main storage medium in the electronic camera according to a conventional art.

A digital still camera having the HDD serving as the storage medium records as one recording file a moving image in the pickup operation of the moving image. The moving image data recorded to the HDD as one recording file has the amount of data excessively larger than the recording capacity of SD-card. Therefore, one piece of moving image data recorded to the HDD needs to be divided, be transferred, and be copied to a plurality of SD-cards. Referring to FIG. 10, the moving image data having the amount of data of 2 GB recorded as one recording file PDR_0001.avi to the HDD having the recording capacity of 2 GB is not transferred to be copied to one SD-card having the recording capacity of 512 MB. Therefore, the moving image data having the amount of data of 2 GB recorded to the HDD must be divided into a plurality of SD-cards having the recording capacity of 512 MB and be copied. Further, the moving image data divided, transferred, and copied to the plurality of SD-cards must clearly correspond to the original moving image data recorded to the HDD.

According to the embodiment of the present invention, the moving image data recorded to the HDD corresponds to the moving image data divided, transferred, and copied to the plurality of SD-cards, upon transferring and recording, to another storage medium, the moving image data recorded to the HDD using the SD-cards as transfer media.

Figure 1:
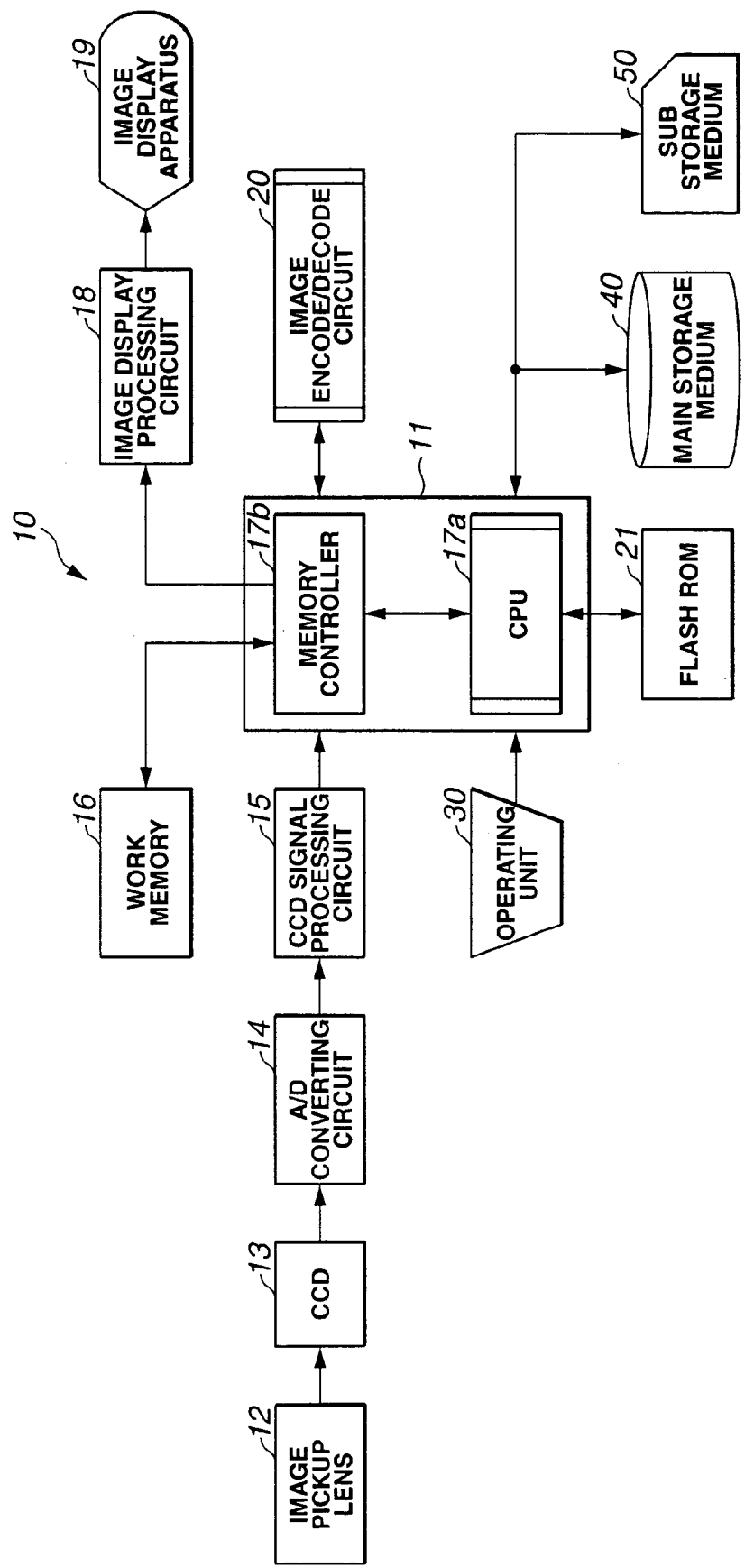
FIG. 1 is a block diagram showing the entire structure of an electronic camera according to one embodiment of the present invention.
Figure 2:
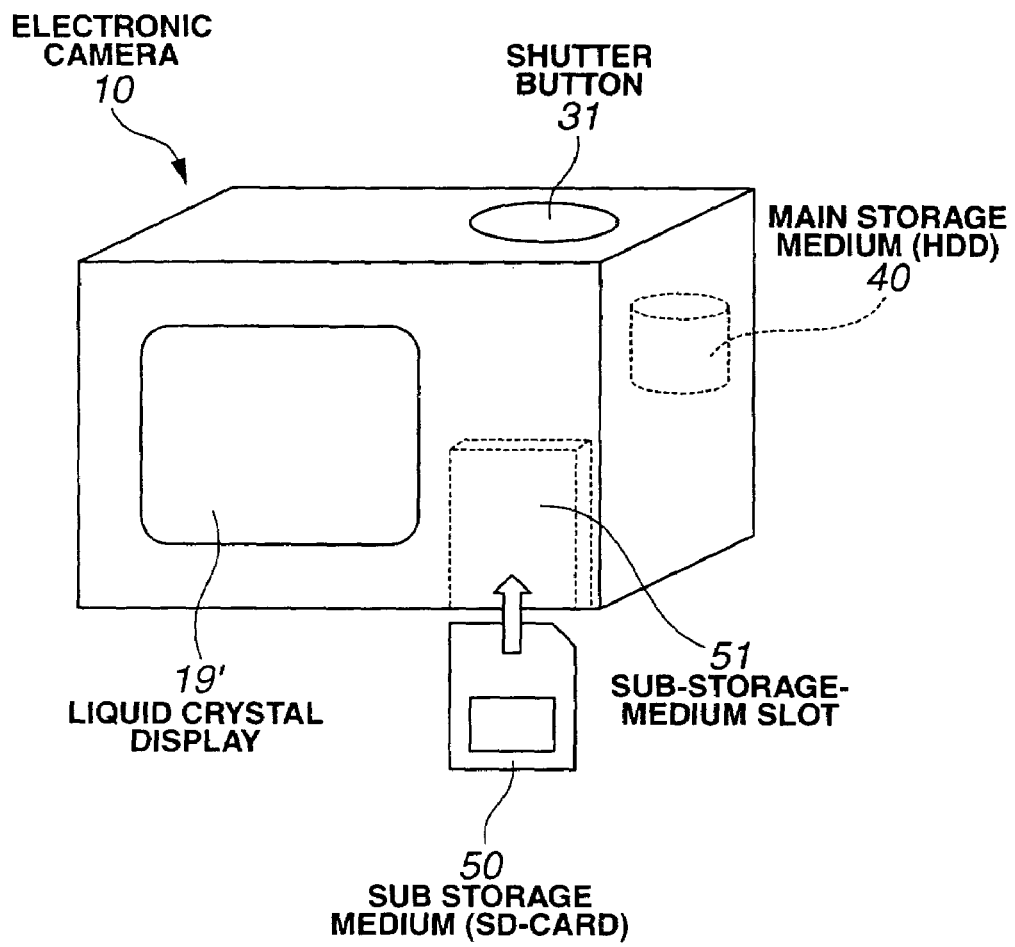
FIG. 2 is a rear perspective view showing the structure of appearance of the electronic camera according to the embodiment of the present invention.

The electronic camera will be described according to the embodiment of the present invention. FIG. 1 is a block diagram showing the entire structure of the electronic camera according to the embodiment of the present invention. FIG. 2 is a rear perspective view showing the structure of appearance of the electronic camera according to the embodiment of the present invention. An electronic camera 10 serving as a digital still camera will be described according to the embodiment of the present invention.

The structure of the electronic camera 10 according to the embodiment of the present invention comprises: a microcomputer 11; an image pickup lens 12; a charge coupled device (hereinafter, referred to as a CCD) 13; an analog/digital converting circuit (hereinafter, referred to as an A/D converting circuit) 14; a CCD signal processing circuit 15; a work memory 16; an image display processing circuit 18; an image display apparatus 19; an image encode/decode circuit 20; a flash ROM 21; an operating unit 30; a main storage medium 40; and a sub storage medium 50. The microcomputer 11 comprises: a CPU 17a; and a memory controller 17b.

The image pickup lens 12 forms an optical image of a subject onto the CCD 13. The CCD 13 converts, into an electronic signal, the optical image of the subject which is picked-up by the image pickup lens 12. The electronic signal converted by the CCD 13 is converted into a digital signal from an analog signal by the A/D converting circuit 14, and is supplied to the CCD signal processing circuit 15.

The CCD signal processing circuit 15 creates a luminance signal and color difference signals based on the digital signal from the CCD 13, and obtains a digital image signal after the γ correction and the contour emphasis and correction. The digital image signal is temporarily stored in the flash ROM 21 via the memory controller 17b by the CPU 17a in the microcomputer 11. The CCD 13, the A/D converting circuit 14, and the CCD signal processing circuit 15 constitute an image pickup unit.

The CPU 17a of the microcomputer 11 controls the memory controller 17b to read and develop a driving control program of various circuit functions stored in the work memory 16. The CPU 17a controls the driving operation of circuit functions on the control program read from the work memory 16 in response to various operating instructions inputted from the operating unit 30 by the user.

The CPU 17a mainly controls: the temporary storage of the digital image signal from the CCD signal processing circuit 15 into the flash ROM 21; the reading operation of the digital image signal temporarily-stored in the flash ROM 21 and the supply operation of the digital image signal to an image display unit comprising the image display processing circuit 18 and the image display apparatus 19 and a digital image data creating unit of the image encode/decode circuit 20; and the recording and reading operation of the digital image data which is created after predetermined encoding and compression by the image encode/decode circuit 20, to the main storage medium 40 or sub storage medium 50 serving as the storage medium.

The image display processing circuit 18 performs processing for displaying a photo-picture on the image display apparatus 19 by using the digital image signal supplied via the memory controller 17*b* under the control of the CPU 17*a*. The image display apparatus 19 comprises a picture image display device such as a liquid crystal display, and displays the photo-picture under the control of the image display processing circuit 18. A touch panel is also arranged to the liquid crystal display of the image display apparatus 19, and the operation or control of the electronic camera 10 is instructed by touching the touch panel by the user.

The image encode/decode circuit 20 receives the operation of the pickup operation of the moving image from the operating unit 30 by the user and then encodes and compresses the digital moving image signal which is created by the CCD signal processing circuit 15 and is temporarily stored in the flash ROM 21, and converts the signal into the digital moving image data. The encoding and compression of the moving image signal convert the data into the digital moving image data based on the MPEG3 system. The user inputs the operation for picking-up the still image and then the image encode/decode circuit 20 encodes and compresses the digital still image signal which is created by the CCD signal processing circuit 15 and is temporarily stored in the flash ROM 21 and further converts the data into the digital still image data. The encoding and compression of the still image signal convert the data into the digital still image data based on the MPEG1 system. That is, the image encode/decode circuit 20 forms a digital image data creating unit.

The digital moving image data or digital still image data converted by the image encode/decode circuit 20 is recorded to the main storage medium 40 under the control of the CPU 17*a*.

Further, the image encode/decode circuit 20 reads the digital moving image data or digital still image data recorded to the main storage medium 40 under the control of the CPU 17*a*, performs predetermined decoding and decompression of the read data, demodulates the processed data to the digital image signal of the moving image or still image, and temporarily stores the demodulated data to the flash ROM 21. Further, the CPU 17*a* reads the demodulated digital image signal which is temporarily stored in the flash ROM 21, the image display processing circuit 18 performs predetermined display processing of the read signal, and the image display apparatus 19 displays the picked-up moving image or still image.

The flash ROM 21 temporarily stores the digital image signal created by the CCD signal processing circuit 15 under the control of the CPU 17*a*, and temporarily stores the digital image signal which is encoded and compressed by the image encode/decode circuit 20 or the digital image signal which is decoded and decompressed.

The operating unit 30 comprises a switch, a button, a touch panel, and the like which are used when the user picks-up on the electronic camera 10 and instruct various operations as follows: controlling the exposure and the focusing of the image pickup lens 12; selecting the moving image or still image; a shutter button for picking-up it; and recording and reading the digital image data to the main storage medium 40 or the sub storage medium 50, which will be described later.

The main storage medium 40 is constituted of the above-mentioned compact HDD with a large recording capacity. Basically, the HDD is included in a casing of the electronic camera 10 so as to prevent the easy detachment by the user. The sub storage medium 50 is constituted of the above-mentioned SD-card. The SD-card is attached to the electronic camera 10 so as to be detachable by the user.

Referring to FIG. 2, with respect to the appearance of the electronic camera 10 with the above structure, the electronic camera 10 comprises the image pickup lens 12 and a sensor for measuring light or distance (not shown) on the front side of the casing. The electronic camera 10 comprises, on the rear side thereof, a liquid crystal display 19' serving as the image display apparatus 19, and mode setting buttons comprising a button and a switch (not shown) for selecting and inputting various operating modes such as the selection of the moving image or still image of the electronic camera 10, the image quality setting in the operation for picking-up the still image, the setting of the pickup date, and the display of a recording situation or free-space capacity of the storage medium. The liquid crystal display 19' has also a touch panel. The touch panel displays a setting screen of the various operating modes such as a setting input screen of the recording capacity in the division and recording of the image data to the main storage medium 40 according to the embodiment, which will be described later.

The electronic camera 10 comprises, on the top of the casing thereof, a shutter button 31 which instructs the start and end of the image pickup operation of moving image or still image. Further, the casing of the electronic camera 10 includes the above-mentioned circuit functions 13 to 21, and further comprises the HDD serving as the main storage medium 40 (hereinbelow, also referred to as the HDD 40) and the sub-storage-medium slot 51 which detaches the SD-card serving as the sub storage medium 50 (hereinafter, also referred to as the SD-card 50).

Next, a description is given of the operation of the data recording control unit of the CPU 17*a*, which divides the picked-up digital moving image data in the image pickup operation of the moving image into a plurality of recording files and records the divided recording files to the main storage medium 40 according to the embodiment of the present invention.

In the electronic camera 10, the moving image pickup mode is selected and is inputted by using the mode setting button of the operating unit 30 by the user, then, the shutter button 31 is pressed, the image pickup operation of the moving image starts, and the moving image is picked-up during pressing the shutter button 31. The A/D converting circuit 14 and the CCD signal processing circuit 15 convert, into the digital moving image signal, the electronic signal of the subject converted by the CCD 13 in the image pickup operation of the moving image. The digital moving image signal is temporarily stored in the flash ROM 21 under the control of the CPU 17*a*. The CPU 17*a* reads the digital moving image signal temporarily-stored in the flash ROM 21, the image display processing circuit 18 performs the image display processing of the read signal, and the liquid crystal display 19' of the image display apparatus 19 displays the picked-up moving image. Further, the CPU 17*a* enables the image encode/decode circuit 20 to encode and compress the digital moving image signal to a predetermined moving image signal. Further, the CPU 17*a* enables the image encode/decode circuit 20 to convert the processed data into the digital moving image data and to record the converted data to the HDD 40 serving as the main storage medium 40.

Figure 3:
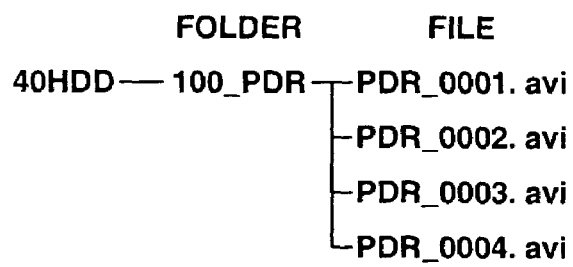
FIG. 3 is an explanatory diagram for a recording folder and a recording file which record moving image data to a main storage medium in the electronic camera according to the embodiment of the present invention.

Upon recording, to the HDD 40, the digital moving image data converted by the image encode/decode circuit 20, referring to FIG. 3, the CPU 17*a* creates in the HDD 40 a recording folder 100_PDR for the moving image, and sets a plurality of recording files PDR_0001.avi to PDR_0004.avi every predetermined capacity in the recording folder 100_PDR. That is, the CPU 17*a* divides and sequentially records the digital moving image data continuously-picked-up on time series into the plurality of recording files PDR_0001.avi to PDR_0004.avi which are set every predetermined recording capacity in the recording folder 100_PDR of the HDD 40.

Figure 4:
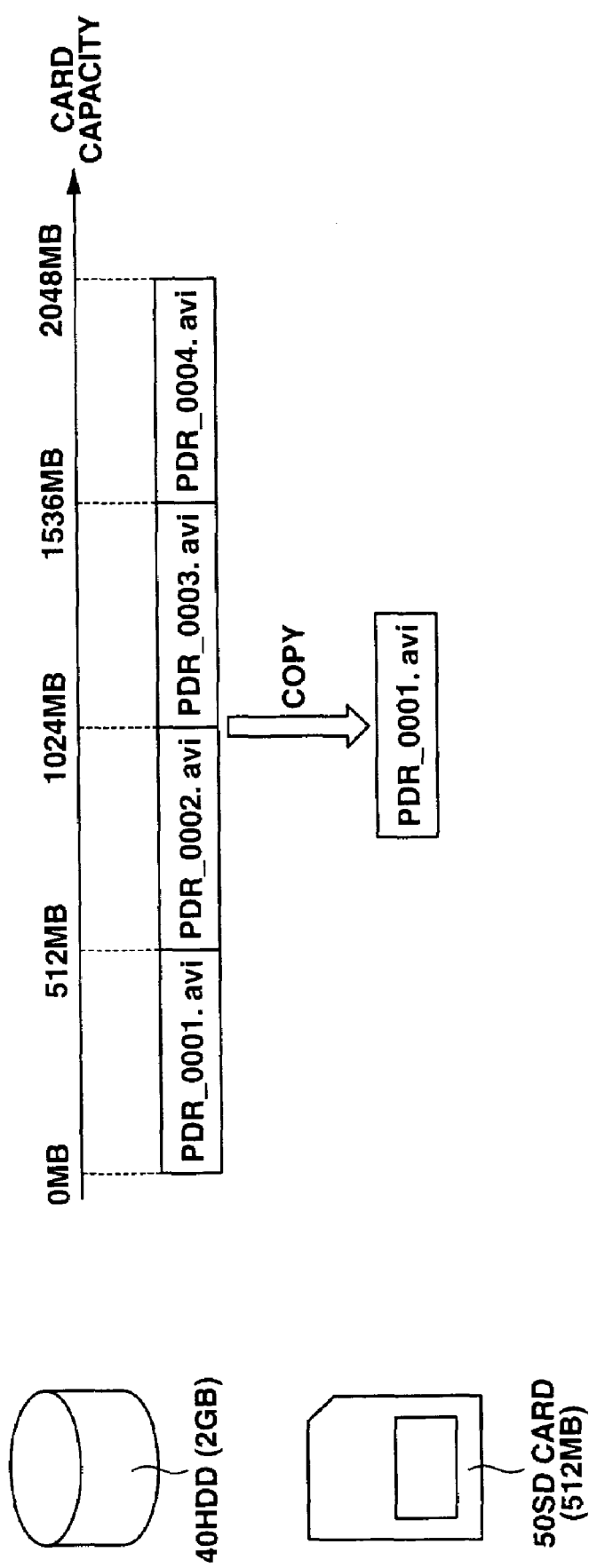
FIG. 4 is an explanatory diagram which copies and records, to a sub storage medium, the moving image data which is obtained by dividing the recording file to the main storage medium in the electronic camera and by recording the divided recording files according to the embodiment of the present invention.

A description is given of the state for dividing the digital continuous moving image data on time series into the plurality of recording files PDR_0001.avi to PDR_0004.avi and for recording the divided recording files to the HDD 40 with reference to FIG. 4. The CPU 17a sets and creates the recording files PDR_0001.avi to PDR_0004.avi every recording capacity of 512 MB of the SD-card to the HDD 40 having the recording capacity of 2 GB. That is, the CPU 17a starts the image pickup operation of the moving image, then, the digital moving image data is recorded, starting from the first recording file PDR_0001.avi set to the HDD 40. The digital moving image data recorded to the first recording file PDR_0001.avi reaches the recording capacity of 512 MB and then the next recording file PDR_0002.avi is set and is continuously recorded. As mentioned above, the CPU 17a creates a recording file and records the subsequent digital moving image data each time when the digital moving image data to be recorded reaches the recording capacity of 512 MB.

That is, the digital moving image data having the amount of data of 2 GB is divided into the four recording files PDR_0001.avi to PDR_0004.avi each having the recording capacity of 512 MB and is recorded to the HDD 40 having the recording capacity of 2 GB. The recording capacity of the recording files PDR_0001.avi to PDR_0004.avi is the same as that of the SD-card 50 having the recording capacity of 512 MB. Therefore, the digital moving image data recorded to the recording files PDR_0001.avi to PDR_0004.avi in the HDD 40 is divided into four SD-cards 50 and is transferred and recorded to the four SD-cards 50.

Next, a description is given of the setting of the recording capacity of the recording file which is divided and is recorded to the HDD 40. The user uses a mode setting button of the operating unit 30 in the electronic camera 10 and enables the CPU 17a to develop a setting mode of dividing and recording to the HDD 40. The setting mode of dividing and recording is developed and then the CPU 17a displays a dividing size setting screen 25 shown in FIG. 5 on the liquid crystal display 19' of the image display apparatus 19.

The dividing size setting screen 25 displayed on the liquid crystal display 19' in the electronic camera 10 comprises: setting area 26 including a plurality of fixed capacities, serving as first setting of size in recording file; setting area 27 including SD-card size and SD-card free-space size, serving as second setting of size in recording file, for detecting the size/free-space capacity of SD-card and setting the detected size/free-space capacity of SD-card; and setting area 28 of the input of a direct value, serving as third set of size in recording file.

The setting area 26 displays, from the plurality of fixed capacities serving as the first setting of size in recording file, the commercially available sizes of recording capacity of the SD-card 50 attached to the sub-storage-medium slot 51, e.g., six sizes including 128 MB, 256 MB, 512 MB, 1024 MB, 1536 MB, and 2024 MB. The user selects and inputs the size of the sub storage medium 50 attached to the electronic camera 10 from the six displayed sizes. The CPU 17a sets the recording capacity size of divided and recording file to the HDD 40 from among the size selected and inputted by the user.

The setting area 27 for detecting the size/free-space capacity of the SD-card and setting the detected size/free-space capacity of the SD-card, serving as the second setting of size in recording file, detects the total size of recording capacity of the SD-card 50 attached to the sub-storage-medium slot 51, or detects the size of free-space capacity with no recorded data in the SD-card 50 attached to the sub-storage-medium slot 51, by using an SD-card capacity detecting unit (not shown) arranged to the electronic camera 10. The CPU 17a sets the size of divided and recording file of the HDD 40 in accordance with the total size of recording capacity of the SD-card 50 detected by the SD-card detecting unit or the size of free-space capacity.

The setting area 28 for inputting the direct value, serving as the third setting of size in recording file, inputs values between the minimum size to maximum size of the recording capacity set in advance by operating an up/down button by the user, and inputs the capacity size in a divided and recording file. The CPU 17a sets the capacity size of the divided and recording file of the HDD 40 in accordance with the capacity size inputted by the user.

The user selects and touches the setting method of the desired size in accordance with the dividing size setting screen 25 displayed on the liquid crystal 19' of the electronic camera 10, and sets the capacity size of the divided and recording file upon recording the digital moving image data to the HDD 40.

Figures 5, 6:
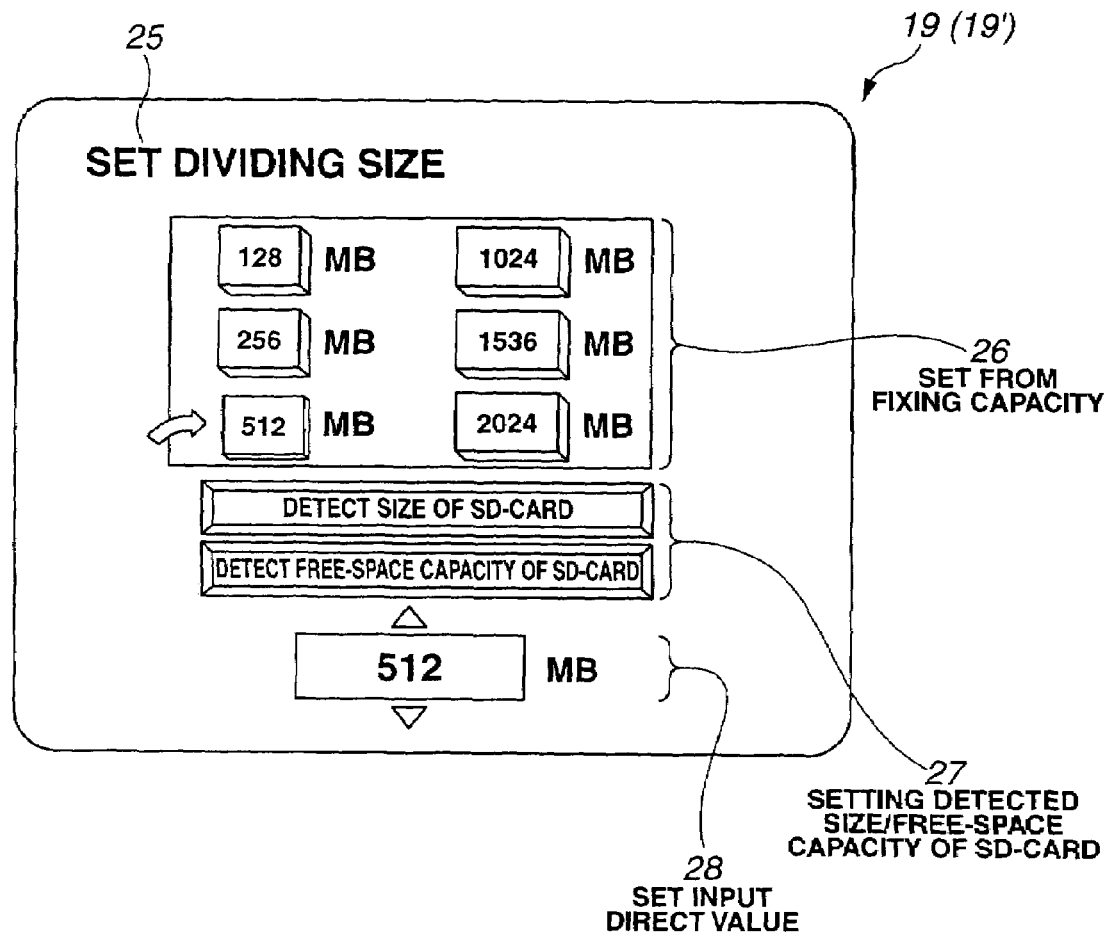
FIG. 5 is an explanatory diagram of a screen which sets the dividing size of recording file, which is set to the main storage medium in the electronic camera according to the embodiment of the present invention.
FIG. 6 is an explanatory diagram of a list of divided recording files which is created upon dividing and recording the recording files to the main storage medium in the electronic camera according to the embodiment of the present invention.

FIG. 5 shows the state (shown by an arrow) for selecting 512 MB in the setting area 26 serving as the first setting of size in recording file, from the fixing capacities.

The CPU 17a records the digital continuous moving image data on time series in accordance with the size of divided and recording file, which is set to the HDD 40 in accordance with the dividing size setting screen 25. The list of recording files created by the CPU 17a will be described with reference to FIG. 6.

The list of divided and recording files includes: a file name; start time and end time of the recording of the digital moving image data of the file name; and link destination information at ending, indicating the next recording file, for continuously recording of the size in recording capacity of the file upon ending the recording of the digital moving image data up to the size of capacity.

Figure 7:
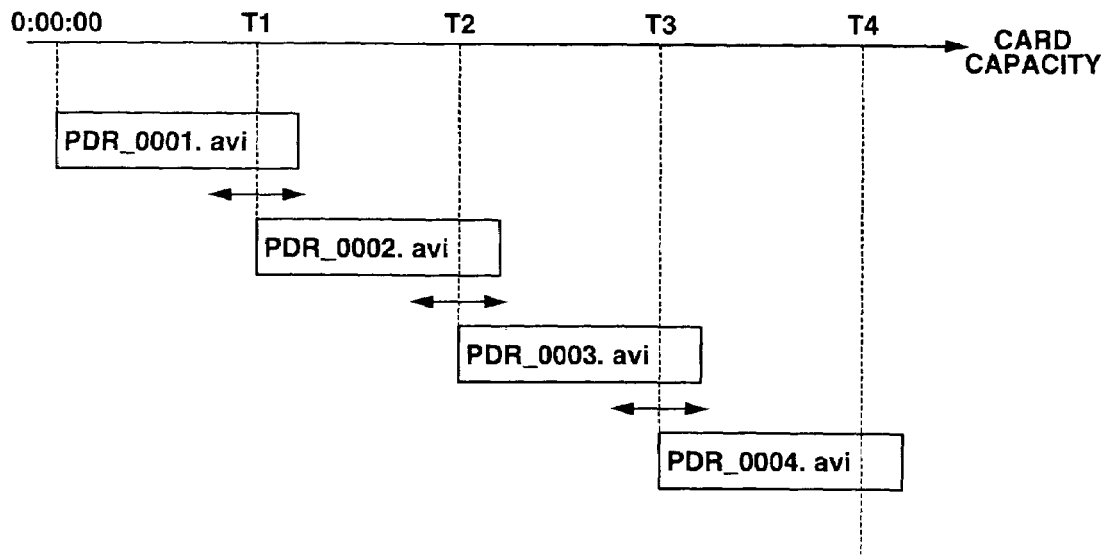
FIG. 7 is an explanatory diagram for redundantly recording the moving image data between recording files upon dividing the recording file and recording the divided recording files to the main storage medium in the electronic camera according to the embodiment of the present invention.

In order to ensure the digital continuous moving image data on time series recorded to each recording file upon dividing and recording to a plurality of recording files with a preset capacity size, referring to FIG. 7, the CPU 17a redundantly records the digital moving image data for 30 sec before the recording end time of the first PDR_0001.avi and that for 30 sec after the recording start time of the second PDR_0002.avi (for a period shown by an arrow). Thus, the digital moving image data between the recording files are continuously read and played as continuous data on time series.

The CPU 17a records the redundantly recorded time information for 30 sec before the recording end time and after the recording start time of the recording file to the link destination information at the recording end time in the list of divided and recording files shown in FIG. 6, together with the next recording file name and time information for redundant recording. The CPU 17a further controls the timing for reading and playing the digital moving image data from the next recording file based on the redundant time information of the list of divided and recording files.

As mentioned above, the electronic camera 10 according to the embodiment divides and sets the recording file of the digital continuous moving image data on time series to each allowable recording capacity of the SD-card 50 and records the divided recording files to the HDD 40.

Next, a description is given of the operation for transferring and recording the digital moving image data which is divided and is recorded based on the unit of recording file to the HDD 40 by using the SD-card 50 serving as a storage medium for data transfer. The user uses an operating button of the operating unit 30 with regard to the CPU 17a to input an operating mode for transferring and recording the data from the HDD 40 to the SD-card 50. The CPU 17a transfers, to the SD-card 50 attached to the electronic camera 10, the digital moving image data in each recording file recorded to the HDD 40, under the operating mode for transferring and recording the data, and copies and records the transferred data. That is, the digital moving image data is divided into the four recording files PDR_0001.avi to PDR_0004.avi and then the four recording files PDR_0001.avi to PDR_0004.avi are recorded to the HDD 40. The above-mentioned digital moving image data is copied and is recorded to one SD-card 50 corresponding to each of the recording files PDR_0001.avi to PDR_0004.avi, that is, is divided, copied, and recorded to four SD-cards 50.

The HDD 40 after transferring, copying, and recording the recording files to the four SD-cards 50 erases the digital moving image data of the recording files PDR_0001.avi to PDR_0004.avi, thereby enabling recording new moving image data. A plurality of SD-cards 50 are portable and retained by the user, and the data of the SD-cards 50 is transferred and recorded to another storage medium such as a DVD-RAM, in order of the transferred and recorded recording files PDR_0001.avi to PDR_0004.avi and the SD-cards 50 by using the personal computer later.

The recording of the digital moving image data for the image pickup operation of the moving image has been described according to the embodiment. However, the present invention can be applied to the recording of audio continuous data on time series and various data, in place of the digital moving image data. Further, the electronic camera 10 is used as the digital still camera according to the embodiment. However, the present invention can be applied to a digital video camera or a data recording apparatus which records digital information data including characters continuous on time series and symbols. The electronic camera 10 may be a data recording apparatus comprising the image encode/decode circuit 20 serving as a digital information data creating unit for converting the information continuous on time series into the digital information data.

Figure 8:
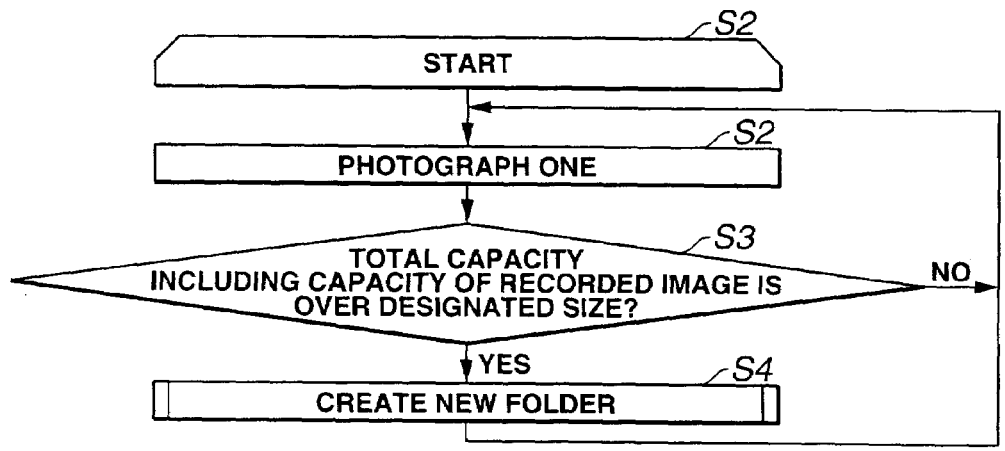
FIG. 8 is a flowchart of the operation for creating the recording folder which records still image data to the main storage medium in the operation for picking-up a still image of the electronic camera according to the embodiment of the present invention.

Next, a description is given of the electronic camera 10 comprising a data recording control unit of the CPU 17a which divides picked-up digital still image data into a plurality of recording files and records the divided recording files to the main storage medium 40 in the still-image pickup operation according to the embodiment of the present invention, with reference to FIG. 8.

The user selects and inputs a mode for picking-up the still image by using the mode setting button of the operating unit 30 and then an image pickup signal of the subject at the timing of pressing the shutter button 31 is captured in the electronic camera 10, as a still image signal. The CPU 17a has the A/D converting circuit 14 and the CCD signal processing circuit 15 convert the electronic signal of the subject converted by the CCD 13 at the timing of pressing the shutter button 31 into a digital still image signal so as to temporarily store the converted signal to the flash ROM 21. Further, the CPU 17a has the image display processing circuit 18 perform the image display processing of the digital still image signal temporarily-stored in the flash ROM 21, and the liquid crystal 19' of the image display apparatus 19 display the picked-up still image. Furthermore, the CPU 17a has the image encode/decode circuit 20 encode and compress the digital still image signal by a predetermined still image signal processing in order to convert the digital still image signal to the digital still image data, and the HDD 40 as the main storage medium to record the converted digital still image data.

Figure 9:
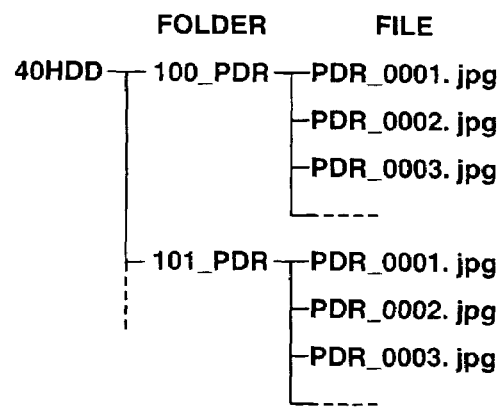
FIG. 9 is an explanatory diagram of a relationship between the recording file and the recording folder for recording the still image data to the main storage medium in the operation for picking-up the still image in the electronic camera according to the embodiment of the present invention.

The CPU 17a records the digital still image data created by the image encode/decode circuit 20 to the HDD 40. Upon recording the digital still image data to the HDD 40, unlike the above-mentioned recording of the digital moving image data, the dividing and recording folder is created to the HDD 40 based on the recording capacity of the SD-card 50. One dividing and recording folder is created by setting the digital still image data of one still image as one recording file. Referring to FIG. 9, the CPU 17a sets a plurality of recording folders 100_PDR, 101_PDR, . . . to the HDD 40 based on the recording capacity of the SD-card 50. One recording folder 100_PDR is created by setting the digital still image data containing one still image, and a plurality of divided still images are recorded respectively to a plurality of recording files PDR_0001.jpg, PDR_0002.jpg, PDR_0003.jpg, . . . . When the total recording capacity of the recording files PDR_0001.jpg, PDR_0002.jpg, PDR_0003.jpg, . . . recorded to the recording folder 100_PDR is over the recording capacity set to the recording folder 100_PDR, the CPU 17a sets the new recording folder 101_PDR. The CPU 17a sets the recording files PDR_0001.jpg, PDR_0002.jpg, PDR_0003.jpg, . . . for each of the still images to the recording folder newly set, and divides and records the PDR_0001.jpg, PDR_0002.jpg, PDR_0003.jpg, . . . .

The digital still image data does not need to be continuous on time series. Therefore, the CPU 17a creates in the HDD 40 the recording folders divided every recording capacity of the SD-card 50, and sets and records a plurality of recording files for each still image in the created recording folder. Further, when the total amount of recording data in the plurality of recording files in one recording folder of the HDD 40 is over the recording capacity set to the recording folder, the CPU 17a creates a new recording folder. Further, the CPU 17a creates a plurality of recording files in the new recording file and sequentially records the still image data.

In the still image pickup operation, the electronic camera 10 enables the user to select and set the picture quality by the operating unit 30. The electronic camera 10 has the amount of still image data varying depending on the quality of still image, and has the larger amount of data, the higher quality the still image has. Therefore, the recording folder set to the HDD 40 has the number of recording files varying depending on the quality of picked-up still image. Thus, the CPU 17a adds the amount of data of the recording file which has already been recorded and monitors whether or not the amount of data as the addition result is over the recording capacity set to the recording folder so as to record the digital still image data to the recording folder of the HDD 40. When the digital still image data for new recording is added and the amount of data as the addition result is over the recording capacity set to the recording folder, the CPU 17a creates a new recording folder.

A description is given of the operation for creating the recording folder by the CPU 17a in the recording of digital still image data with reference to FIG. 8. In step S1, the CPU 17a of the electronic camera 10 starts the driving of a still imager pickup mode when the user selects and inputs the still image pickup mode from the operating unit 30. In step S2, the CPU 17a has the image encode/decode circuit 20 encode and compress the signal of one still image picked-up by operating the shutter button 31 as the still image in order to convert the digital still image signal to digital still image data. Further, the CPU 17a has the digital still image data be recorded as a new recording file in the recording folder set to the HDD 40. In step S3, the CPU 17a determines, upon recording the new digital still image data picked-up in step S2 to the recording folder of the HDD 40, whether or not the total data capacity obtained by adding the amount of data as the addition result of the digital still image data in a plurality of recording files which have already been recorded to the recording folder of the HDD 40 and the amount of digital still image data for recording as a new recording file is over the size of recording capacity set to the recording folder.

If NO in step S3, the CPU 17*a* records the new digital still image data as a new recording file and returns to step S2 whereupon the processing shifts to the image pickup operation of the next still image. If YES in step S3, then, in step S4, the CPU 17*a* creates the new recording folder for recording the new digital still image data to the HDD 40, and records the created recording folder as a recording file of the new recording folder. After ending to create the new recording folder and to record the created files to the new recording folder in step S4, the CPU 17*a* returns to step S2 whereupon the processing shifts to the image pickup operation of the next still image.

As mentioned above, in the image pickup operation of the still image, the electronic camera 10 similarly records a plurality of recording files to the recording folder set to the HDD 40 based on the recording capacity of the SD-card 50. The digital still image data recorded to the HDD 40 can be transferred, copied, and recorded to the SD-card 50 based on the unit of recording folder. Similarly to the moving image data, the data can be transferred to another storage medium via the SD-card 50 serving as a transfer storage medium.

Incidentally, the flowchart shown in FIG. 8 can be used for the operation for creating the recording file of the digital moving image data in the HDD 40 in the image pickup operation of the moving image, by replacing step S2 with a "start of image pickup operation of the moving image by operating the shutter button 31" and further by replacing step S4 with a "creation of new recording file".

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A data recording apparatus, comprising:
   a digital information data creating unit which creates digital information data by performing predetermined encoding and compression on continuous input information signals on time series;
   a storage medium which records the digital information data created by the digital information data creating unit, the storage medium being a main storage medium which divides the digital information data and records the divided digital information data;
   a sub storage medium which is freely detachable and copies and records the digital information data that is divided and recorded to the main storage medium, with a recording capacity smaller than that of the main storage medium; and
   a data recording control unit which divides the digital information data created by the digital information data creating unit into a plurality of data based on the unit of preset data capacity and records the data to the storage medium, wherein, upon dividing and recording the data to the main storage medium of the storage medium, the data recording control unit creates a recording file or folder name for dividing and recording the digital information data, data on the recording start time and recording end time of the digital information data for each recording file or folder name, and a file list containing information on the next recording file or folder name for recording the digital continuous information data, and wherein, upon dividing the digital information data and recording the divided digital information data to the main storage medium of the storage medium, the data recording control unit redundantly records data corresponding to a predetermined time of the head portion and the end portion of the divided and recorded digital information data, and sets the redundantly recorded information to the file list.

2. The data recording apparatus according to claim 1, wherein the data recording control unit copies and records the digital image data recorded to the main storage medium of the storage medium every divided and recorded file to the sub storage medium based on the file list.

3. An electronic camera, comprising:
   an image pickup unit which converts an optical image of a subject into an electronic signal, performs predetermined signal processing of the electronic signal, and creates an image pickup signal;
   a digital image data creating unit which performs predetermined encoding and compression of the image pickup signal created by the image pickup unit and creates digital image data;
   a storage medium which records the digital image data created by the digital image data creating unit, the storage medium being a main storage medium which divides and records the digital image data;
   a sub storage medium which is freely detachable and copies and records the digital image data that is divided and is recorded to the main storage medium, with a recording capacity smaller than that of the main storage medium; and
   a data recording control unit which divides the digital image data based on the unit of preset data capacity and records the divided data to the storage medium, wherein, upon dividing and recording the data to the main storage medium of the storage medium, the data recording control unit creates a recording file or folder name, for dividing and recording the digital information data, data on the recording start time and recording end time of the digital information data for each recording file or folder name and a file list containing information on the next recording file or folder name for recording the digital continuous information data, and wherein, upon dividing the digital information data and recording the divided digital information data to the main storage medium of the storage medium, the data recording control unit redundantly records data corresponding to a predetermined time of the head portion and the end portion of the divided and recorded digital information data, and sets the redundantly recorded information to the file list.

4. The electronic camera according to claim 3, wherein the data recording control unit copies and records the digital image data recorded to the main storage medium of the storage medium every recording and recording to the sub storage medium based on the file list.

* * * * *